US007833608B2

(12) United States Patent
Ushijima et al.

(10) Patent No.: US 7,833,608 B2
(45) Date of Patent: Nov. 16, 2010

(54) BEAM, INK JET RECORDING HEAD HAVING BEAMS, AND METHOD FOR MANUFACTURING INK JET RECORDING HEAD HAVING BEAMS

(75) Inventors: Takashi Ushijima, Kanagawa (JP); Takeo Yamazaki, Kanagawa (JP); Makoto Terui, Kanagawa (JP); Kazuhiro Hayakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 736 days.

(21) Appl. No.: 11/835,746

(22) Filed: Aug. 8, 2007

(65) Prior Publication Data

US 2008/0032073 A1 Feb. 7, 2008

Related U.S. Application Data

(62) Division of application No. 11/008,101, filed on Dec. 10, 2004, now Pat. No. 7,275,813.

(30) Foreign Application Priority Data

Dec. 15, 2003 (JP) ............................ 2003-416843

(51) Int. Cl.
*B32B 3/00* (2006.01)
*B41J 2/05* (2006.01)

(52) U.S. Cl. ........................... 428/156; 347/64; 347/65; 347/56; 428/167; 428/166; 428/172

(58) Field of Classification Search ................. 428/156, 428/166, 167, 172; 347/40, 64, 65, 56, 71
See application file for complete search history.

(56) References Cited

U.S. PATENT DOCUMENTS 5,218,376 A 6/1993 Asai
5,458,254 A 10/1995 Miyagawa et al.
5,478,606 A 12/1995 Ohkuma et al.

(Continued)

FOREIGN PATENT DOCUMENTS

EP 1 308 283 5/2003

(Continued)

OTHER PUBLICATIONS

Patent Abstracts of Japan, vol. 1997, No. 12, Dec. 25, 1997 (JP 09-211019, Aug. 15, 1997).

(Continued)

*Primary Examiner*—David R Sample
*Assistant Examiner*—Catherine Simone
(74) *Attorney, Agent, or Firm*—Fitzpatrick, Cella, Harper & Scinto

(57) ABSTRACT

A beam having a base material of silicon monocrystal and at least one projection which is integrally formed so as to be supported at least at one end thereof and which has two surfaces having an orientation plane (111), includes a bottom surface in a plane which is common with a plane of the base material; a groove penetrating from the bottom surface to a top of the projection; and a protecting member having a resistance property against a crystal anisotropic etching liquid and covering an inner wall of the groove.

1 Claim, 12 Drawing Sheets

U.S. PATENT DOCUMENTS

| | | | |
|---|---|---|---|
| 5,945,260 | A | 8/1999 | Miyagawa et al. |
| 6,143,190 | A | 11/2000 | Yagi et al. |
| 6,155,673 | A | 12/2000 | Nakajima et al. |
| 6,467,884 | B1 | 10/2002 | Murooka et al. |
| 6,488,364 | B1 | 12/2002 | Nakajima et al. |
| 6,672,712 | B1 | 1/2004 | Donaldson |
| 6,834,940 | B2 | 12/2004 | Sugioka et al. |
| 2004/0174407 | A1 | 9/2004 | Hayakawa et al. |
| 2004/0238485 | A1 | 12/2004 | Hayakawa et al. |
| 2005/0140716 | A1 | 6/2005 | Terui |
| 2005/0248623 | A1 | 11/2005 | Komuro et al. |

FOREIGN PATENT DOCUMENTS

| | | |
|---|---|---|
| JP | 54-51837 | 4/1979 |
| JP | 4-10940 | 1/1992 |
| JP | 4-10941 | 1/1992 |
| JP | 4-10942 | 1/1992 |
| JP | 4-12859 | 1/1992 |
| JP | 5-330066 | 12/1993 |
| JP | 6-286149 | 10/1994 |
| JP | 9-211019 | 8/1997 |
| JP | 10-181032 | 7/1998 |

OTHER PUBLICATIONS

Patent Abstracts of Japan, vol. 018, No. 442, Aug. 17, 1994 (JP 06-140661, May 20, 1994).

Patent Abstracts of Japan, vol. 2002, No. 4, Aug. 4, 2002 (JP 2001-334675, Dec. 4, 2001).

(a)

(b)

(a)

(b)

BEAM, INK JET RECORDING HEAD HAVING BEAMS, AND METHOD FOR MANUFACTURING INK JET RECORDING HEAD HAVING BEAMS

This is a divisional application of application Ser. No. 11/008,101, filed Dec. 10, 2004, U.S. Pat. No. 7,275,813.

FIELD OF THE INVENTION AND RELATED ART

The present invention relates to a beam as a microscopic structural member placed in an area which remains filled with liquid or the like, and the method for forming such a beam. In particular, it relates to such a beam that improves in mechanical strength an ink jet recording head which ejects ink to record on recording medium, the method for forming such a beam, an ink jet recording head provided with such a beam, and the method for manufacturing such an ink jet recording head.

An ink jet recording method (disclosed in Japanese Laid-open Patent Application 54-51837, for example), which generates bubbles by heating ink; ejects ink by utilizing the pressure generated by the growth of the bubbles; and adheres the ejected ink to the surface of recording medium, is advantageous in that it is capable of recording at a high speed, is relatively high in image quality, and is low in noises. This recording method makes it easy to record images in color, and also, makes it easy to recording on ordinary paper or the like. It also makes it easy to reduce the size of a recording apparatus. Further, the ejection orifices of an ink jet recording head can be placed in high density. Therefore, ink jet recording method contributes to the improvement of a recording apparatus in terms of resolution and image quality. Thus, a recording apparatus (ink jet recording apparatus) which employs this liquid ejecting method is used, in various forms, as the information outputting means for a copying machine, a printer, a facsimileing machine, etc.

In recent years, the demand has been increasing for means for outputting information in the form of an image which is greater in the amount of data, and therefore, the demand has been increasing for means for recording a highly precise image at a high speed. In order to output a highly precise image, it is required to reliably eject minute ink droplets, and for this purpose, it is necessary to highly precisely form ejection orifices at a high density.

Japanese Laid-open Patent Applications 5-330066 and 6-286149, for example, propose ink jet recording head manufacturing methods capable of highly precisely forming ejection orifices at a high density. Further, Japanese Laid-open Patent Application 10-146979 proposes a method for forming ribs in the orifice plate having ejection orifices. The ink jet recording heads proposed in these documents are of the so-called side shooter type, from which ink droplets are ejected in the direction perpendicular to the surface of the substrate on which heating members are located.

In the case of an ink jet recording head of the "side shooter type", the increase in the density at which ejection orifice are formed, naturally results in the reduction in the distance between the adjacent two ejection orifices, resulting thereby in the reduction in the width of each ink passage to the corresponding ejection orifice. The narrower the ink passage, the longer the time necessary for the ink passage to be refilled with ink after the extinction of the bubbles. In order to reduce this refilling time, it is necessary to reduce the distance between a heat generating member and an ink supplying hole.

As the method for accurately control the distance between an ink supplying hole and a heat generating member, one of the anisotropic etching methods has been known, which uses water solution of alkali, and utilizes the phenomenon that the etching rate is affected by the orientation of the plane of the silicon substrate. In the case of this method, generally, the distance between a heat generating member and ink supplying hole is controlled by using a piece of silicon wafer, the face orientation of which is (100), as the substrate, and anisotropically etching the substrate from the back side of the substrate to precisely form the ink supply hole. For example, Japanese Laid-open Patent Application 10-181032 proposes a method for forming the ink supplying hole, which is the combination of the sacrifice layer formed on the surface of the silicon substrate, and the anisotropic etching method.

In the field of the manufacture of an ink jet recording head, this method of anisotropically etching a silicon crystal has become one of the most useful technologies for precisely forming an ink supplying hole.

However, in order to record images more precisely and at a higher speed than the levels of precision and speed at which images are recorded by an ink jet recording apparatus in accordance with the prior art, not only must ejection orifices be increased in density, but also, the line in which ejection orifices are aligned must be increased in length, which creates a problem. That is, as the line of the ejection orifice is increased in length, the opening of the ink supplying hole is also increased in length; the greater the number of ejection orifices, the greater the length of the opening of the ink supplying hole. As a result, the ink jet recording head (substrate) is reduced in mechanical strength. The reduction in the mechanical strength of the substrate causes the deformation of the substrate and/or damage to the substrate during the process for manufacturing ink jet recording heads. This in turn makes it possible that such problems as reduction in yield, or unsatisfactory recording performance, will occur.

In order to solve the above described problems, the idea of providing an ink jet recording head with two or more ink supplying holes has been studied. However, when two or more ink supplying holes were formed by literally using the method disclosed in Japanese Laid-open Patent Application 10-181032, the distances between some of the ejection orifices and corresponding ink supplying hole became different from the distances between the other ejection orifices and the corresponding ink supplying hole, because the openings of the ink supply holes on the back side of the substrate became different in size from those on the front side, reducing thereby the speed at which the ink passages were refilled with ink. As a result, it was difficult to achieve a practical printing speed.

On the other hand, Japanese Laid-open Patent Application 9-211019 discloses another method for forming a microscopic beam of semiconductor. The beam is roughly triangular in cross section. One of the lateral surfaces coincides with one of the (100) faces of the semiconductor, and each of the other two lateral surfaces coincides with one of the (111) faces of the semiconductor. The beam is formed, as an integral part of the primary portion, by etching the substrate (mother member) formed of a single crystal of silicon so that it is supported by the mother member (substrate), by both lengthwise ends. This method for forming a beam can be used for forming a beam narrower at the bottom, or the portion which coincides with the back surface of the substrate, but, it suffers from the problem that the inward side of the beam is dissolved from the peak of the beam, by the etchant with a high pH value used for anisotropic etching.

SUMMARY OF THE INVENTION

Thus, the primary object of the present invention is to provide an ink jet recording head having corrosion resistant beams, and a method for manufacturing such an ink jet recording head.

Another object of the present invention is to provide a corrosion resistant beam formable as an integral part of a microscopic structure manufacturable with the use of a manufacturing process which employs an anisotropic etching method.

According to an aspect of the present invention, there is provided a beam having a base material of silicon monocrystal and at least one projection which is integrally formed so as to be supported at least at one end thereof and which has two surfaces having an orientation plane (111), comprising a bottom surface in a plane which is common with a plane of said base material; a groove penetrating from said bottom surface to a top of said projection; and a protecting member having a resistance property against a crystal anisotropic etching liquid and covering an inner wall of said groove.

According to this aspect of the present invention, beams are formed, as integral parts of the substrate, on the inward side of the substrate of an ink jet recording head, more specifically, within the common liquid chamber of the ink jet recording head. Therefore, the ink jet recording head (substrate) in accordance with the present invention is superior in mechanical strength to an ink jet recording head in accordance with the prior art.

Further, in the case of an ink jet recording head structured in accordance with the present invention, its common liquid chamber is formed so that the common ink supplying hole of the common liquid chamber faces the front side of the substrate. Further, each beam is triangular in cross section, and each of its two lateral surfaces on the front side of the substrate coincides with one of the (111) faces of the crystal of which the substrate is formed. Therefore, the beam is resistant to the corrosion by ink or the like; it is unlikely to be corroded by ink or the like, from its peak.

According to another aspect of the present invention, there is provided a method for manufacturing a beam having a base material of silicon monocrystal and at least one projection which is integrally formed so as to be supported at least at one end thereof and which has two surfaces having an orientation plane (111), said beam comprising a bottom surface in a plane which is common with a plane of said base material, said method comprising the steps of: (A) forming a groove in said base material from said bottom side; (B) forming a protecting member a protecting member having a resistance property against a crystal anisotropic etching liquid and covering an inner wall of said groove; (C) forming a plurality of beam formation grooves with a position of formation of said beam interposed therebetween; and (D) forming a surface other than said bottom surface of said beam by crystal anisotropic etching of a part of said base material which is faced to the beam formation groove.

The method, in accordance with the present invention, for manufacturing an ink jet recording head, makes it possible to satisfactorily manufacture an ink jet recording head in accordance with the present invention. Further, the shape (vertical measurement, and width of bottom) into which a beam is formed can be easily changed by changing the shape of the grooves formed in the step (e), and the shape of the grooves formed in the step (g) for forming the beams. Further, the surfaces, other than the bottom surface, of each beam, and the surfaces of the side walls of the common liquid chamber, are formed by anisotropic etching. Therefore, these surfaces are parallel to the (111) face of the crystal of which the substrate is formed, being therefore highly resistant to corrosion.

According to a further aspect of the present invention, there is provided an ink jet recording head including a silicon substrate having energy generating means for ejecting said ink through an ejection outlet by application of ejection energy to the ink, and a common liquid chamber, formed in said substrate, for storing ink to be supplied to said ejection outlet, said ink jet recording head comprising at least one beam which has at least one projection formed on a back side of said substrate in said common liquid chamber, said projection being integrally formed so as to be supported at opposite ends thereof and having two surfaces having an orientation plane (111); said beam including a bottom surface in a plane which is common with a plane of said base material; a groove penetrating from said bottom surface to a top of said projection; and a protecting member having a resistance property against a crystal anisotropic etching liquid and covering an inner wall of said groove.

A beam, in accordance with the present invention, for an ink jet recording head can be applicable to various microscopically structured components other than an ink jet recording head. As described above, a beam in accordance with the present invention is unlikely to be corroded from its peak.

According to a further aspect of the present invention, there is provided a manufacturing method for manufacturing an ink jet recording head including a silicon substrate having energy generating means for ejecting said ink through an ejection outlet by application of ejection energy to the ink, and a common liquid chamber, formed in said substrate, for storing ink to be supplied to said ejection outlet, said ink jet recording head including at least one beam which has at least one projection formed on a back side of said substrate in said common liquid chamber, said projection being integrally formed so as to be supported at opposite ends thereof and having two surfaces having an orientation plane (111), said method comprising the steps of (A) forming a groove in said substrate from a back side of said substrate; (B) forming a protecting member a protecting member having a resistance property against a crystal anisotropic etching liquid and covering an inner wall of said groove; (C) forming a plurality of beam formation grooves with a position of formation of said beam interposed therebetween; and (D) crystal anisotropic etching of a part of said substrate facing a beam formation groove to form a beam having at least one projection constituted by two surfaces having an orientation plane (111) and a bottom surface which is common with a back side of said substrate, and a common liquid chamber having a common ink supply port in a front surface of said substrate.

The method, in accordance with the present invention, for forming a beam makes it possible to satisfactorily form the above described beam in accordance with the present invention. It is particularly effective if it is used in a process in which a microscopically structured component is manufactured with the use of an anisotropic etching method. It is similar to the above described head manufacturing method in that the shape (vertical measurement, width of bottom, etc.) into which a beam is formed can be easily changed by changing the shape of the grooves formed in the step (a), and the shape of the grooves formed in the step (c) for forming the beams.

As described above, according to the present invention, an ink jet recording head is improved in mechanical strength by the beams formed in the common liquid chamber of the head. Therefore, the ink jet recording head is prevented from deforming, and therefore, the ejection orifices are prevented from deviating in position. Further, it is possible to manufacture reliable ink jet recording heads which are substantially longer than the ink jet recording heads in accordance with the prior art, making it therefore possible to record more precisely and at a higher speed. Further, the ink jet recording heads in accordance with the present invention are less likely to break while they are manufactured. Therefore, they are higher in yield than the ink jet recording heads in accordance with the prior art. Further, in the case of an ink jet recording head in accordance with the present invention, the opening of the ink supplying hole of the common liquid chamber faces the front side of the substrate, eliminating the problem concerning the refill time. Therefore, the ejection orifices of the ink jet recording head in accordance with the present invention are uniform in ejection frequency, enabling the ink jet recording head to record at a high speed. Further, a beam in accordance with the present invention is unlikely to be corroded from its peak by ink or the like. Therefore, it is well suited for an ink jet recording head. Further, it is also well suited for the beam for a microscopically structured component, in addition to an ink jet recording head, which is always in contact with alkaline liquid or the like, because the beam in accordance with the present invention is resistant to alkali.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Hereinafter, the preferred embodiments of the present invention will be described with reference to the appended drawings.

Embodiment 1

Figure 1:
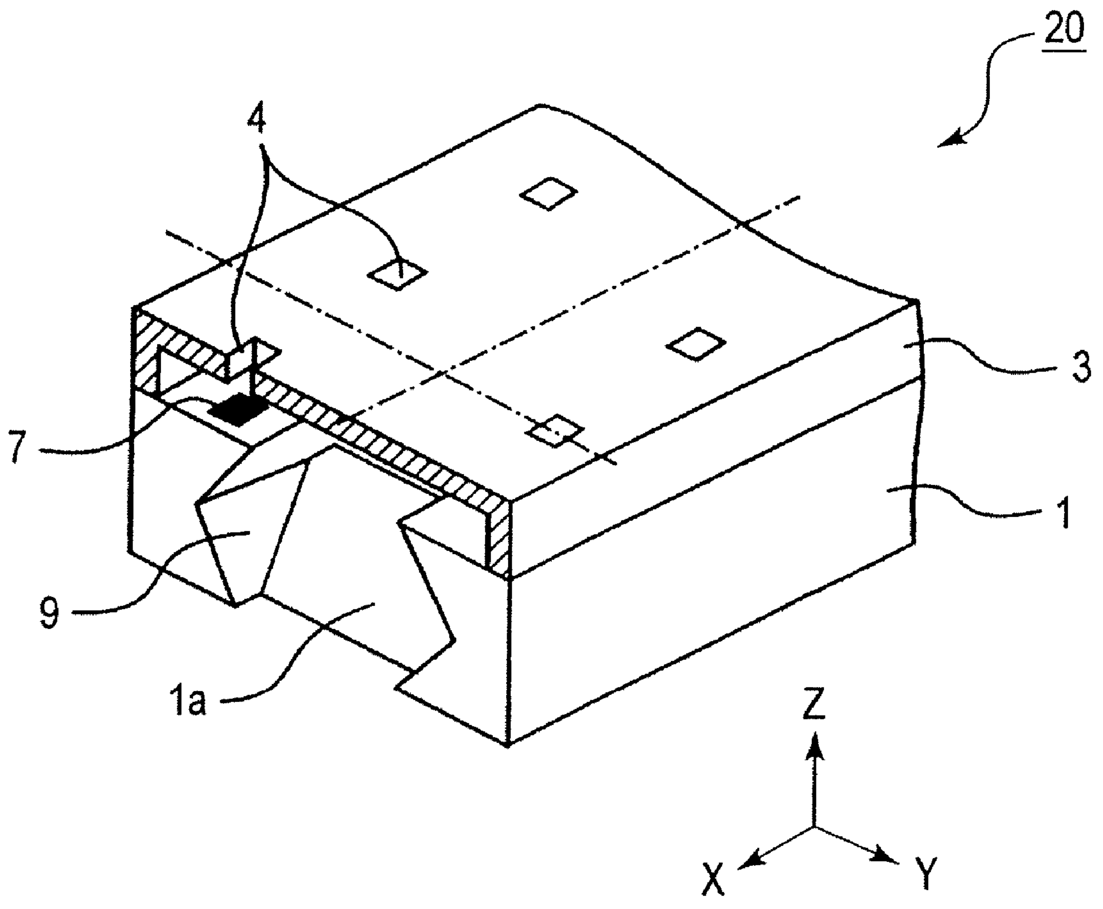
FIG. 1 is a perspective view of an example of an ink jet recording head in accordance with the present invention.
Figure 2:
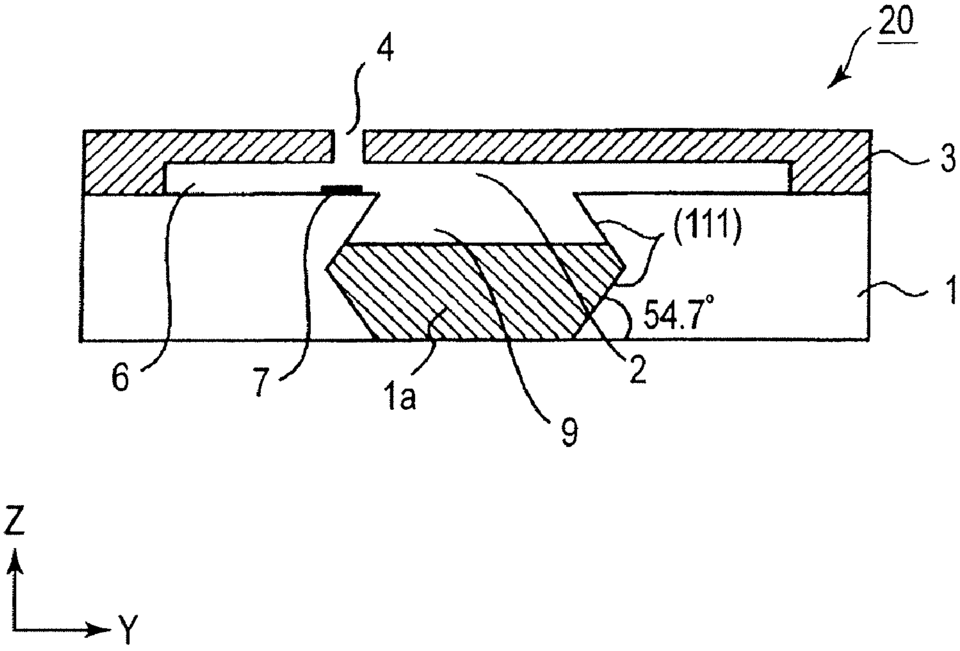
FIG. 2(*a*) is a sectional view of the ink jet recording head shown in FIG. 1, at a plane parallel to the widthwise direction of the ink jet recording head, and FIG. 2(*b*) is the ink jet recording head shown in FIG. 1, at a plane parallel to the lengthwise direction of the ink jet recording head.
Figure 2:
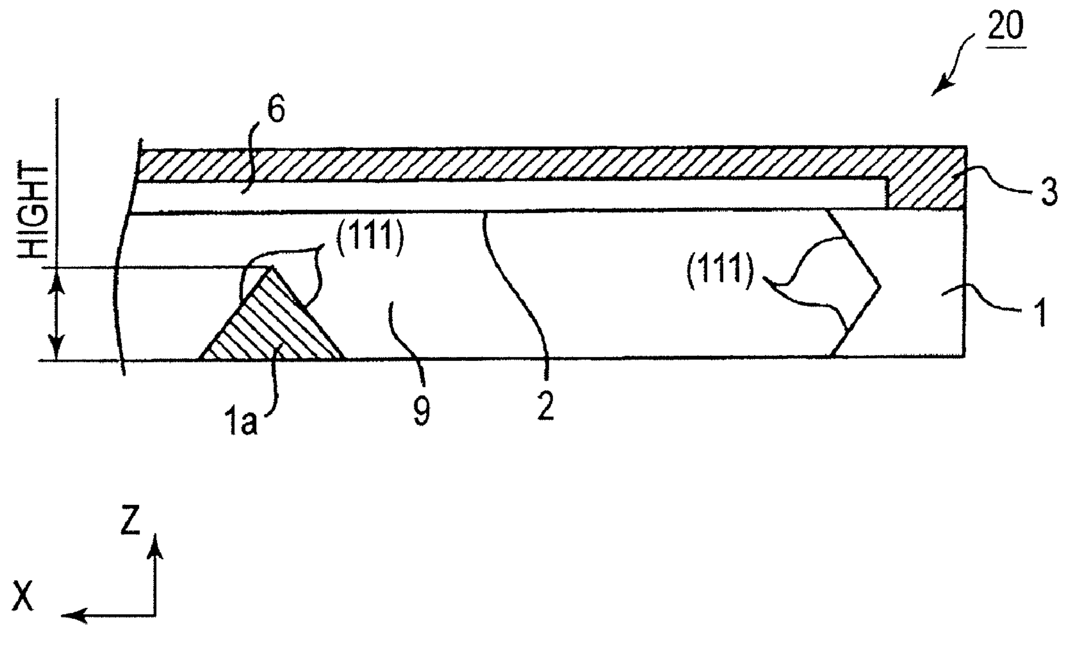

FIG. 1 is a perspective view of an example of an ink jet recording head in this first embodiment. FIG. 2 is a sectional view of the ink jet recording head shown in FIG. 1. FIGS. 2(*a*) and 2(*b*) are sectional views at planes parallel to the widthwise and lengthwise directions, respectively, of the ink jet recording head.

Referring to FIG. 1, the ink jet recording head 20 in this embodiment comprises a substrate 1 formed of a piece of a single crystal of silicon, and an orifice plate 3 having a plurality of ejection orifices and solidly glued to the substrate 1. The substrate 1 has: a common liquid chamber 9 from which ink is supplied to the ejection orifices; and a beam 1*a* which is on the back side of the substrate 1, being inside the common liquid chamber 9.

Referring to FIG. 2, the common liquid chamber 9 extends from one end of the substrate 1 to the other. The orientation of the side walls (internal wall) of the common liquid chamber 9 formed of a single crystal of silicon (substrate 1) matches that of the (111) face of the silicon crystal. More specifically, the common liquid chamber 9 is formed by isotropically etching the substrate 1 so that the top and bottom sides of its side walls, which are parallel to the (111) face of the silicon crystal, meet at the center of the substrate 1 in terms of the thickness direction (direction Z in drawing) of the substrate 1. Thus, the common liquid chamber 9 is shaped so that the closer to the center of the substrate 1, in terms of the thickness direction of the substrate 1, the wider; the common liquid chamber 9 is widest at the center of the substrate 1 in terms of the thickness direction of the substrate 1.

Referring to FIG. 2, the beam 1*a* is a structural member for reinforcing the entirety of the ink jet recording head. The beam 1*a* has a roughly triangular cross section, and its bottom surface, that is, one of its three lateral surfaces, coincides with the back surface of the substrate 1. There is no limit for the number of the beam 1*a*; two or more beams 1*a* may be provided. The ink jet recording head 20 in the drawing is provided with only one beam 1*a*. The beam 1*a* is formed so that it extends in the Y direction in the drawing, which is parallel to the front and rear surfaces of the substrate 1, and is supported by the substrate 1, by both of its lengthwise ends. The other two of the three lateral surfaces of the beam 1*a*, that is, the two surfaces on the top side, face the common liquid chamber 9, and there are parallel to the (111) face of the silicon crystal. Referring to FIG. 2(*b*), the height of the beam 1*a*, that is, the measurement of the beam 1*a* in terms of the thickness direction (Z direction in drawing) of the substrate 1 is set to be less than the thickness of the substrate 1. In other words, the two surfaces of the beam 1$a$ on the top side constitute parts of the walls of the common liquid chamber 9, the top side of which is open as an ink supplying hole.

The bottom surface of the beam 1$a$ is covered with a protective layer 14 formed of a substance resistant to alkalis. Further, the beam 1$a$ is provided with a projection 14$a$ (protective member), which is formed of the same substance as the material for the protective layer 14, and extends in the direction perpendicular to the bottom surface of the beam 1$a$. The top end of the projection 14$a$ roughly coincides with the top (peak) of the beam 1$a$. More precisely, the projection 14$a$ extends slightly beyond the peak of the beam 1$a$. Firstly, this beam protecting layer 14 and projection 14$a$ have the effect of preventing the beam 1$a$ from being etched from its peak during the formation of the common liquid chamber 9, which will be described later. Secondly, they prevent the beam 1$a$ from being corroded from the peak, by ink.

The above described ink jet recording head 20 in the first embodiment of the present invention is provided with a beam 1$a$ (reinforcement structure), which is in the common liquid chamber 9. Therefore, the it is greater in mechanical strength than an ink jet recording head in accordance with the prior art. Thus, even if the ink supplying opening is substantially increased in length, the substrate 1 is prevented by the beam 1$a$ from deforming. Therefore, it does not occur that the ejection orifices deviate in position due to the deformation of the substrate 1. Further, the two lateral surfaces of the beam 1$a$, on the top side, are parallel to the (111) face of the silicon, being slower in the rate at which they are etched by water solution of alkali. In other words, the beam 1$a$ is less likely to be corroded by alkaline ink. Therefore, the ink jet recording head 20 is superior in terms of corrosion resistance.

A beam such as the above described reinforcement beam 1$a$, and the manufacturing method therefor, are useful for various microscopic structures provided with such a beam, in particular, when an anisotropic etching method is used for the manufacturing process for a given microscopic structure.

Referring to FIG. 1 or 2($b$), the ink jet recording head 20 is structured so that the ink supplying opening 2 of its common liquid chamber 9 is on the top surface side of the substrate 1. Therefore, the ejection orifices (unshown) are uniform in the distance from the ink supplying opening 2. In addition, this distance is relatively short. Therefore, the problematically slow ink refill attributable to the length of the ink passages (distance) is not likely to occur.

Further, the side walls of the common liquid chamber 9 are parallel to the (111) face of the silicon substrate 1. Therefore, it is not likely to be corroded by the alkaline ink, making the ink jet recording head superior in corrosion resistance.

Referring to FIG. 2, in the case of the ink jet recording head 20, in terms of the cross section parallel to the top and bottom surfaces of the substrate 1, the common liquid chamber 9 is greater at the mid point of the common liquid chamber 9, in terms of the thickness direction of the substrate 1, than the sum of the openings of the common liquid chamber 9 located at the bottom surface of the substrate 1. In comparison, in the case of an ink jet recording head in accordance with the prior art, the common liquid chamber 9 is trapezoidal in vertical cross section, being wider at the bottom; in other words, it gradually reduces in horizontal cross section starting from the bottom side. Therefore, in order to increase the volume of the common liquid chamber 9, the common liquid chamber 9 had to be increased in the size of its bottom opening. In the case of this ink jet recording head 20, however, the common liquid chamber 9 is as large in volume as that of an ink jet recording head in accordance the prior art, while being smaller in the size of its bottom opening. In other words, the back side portion of the substrate 1 remains intact by a greater amount than in the case of the ink jet recording head in accordance with the prior art, leaving a greater portion of the substrate 1 as the area to which the liquid passage plate (FIG. 3) is glued.

Figure 3:
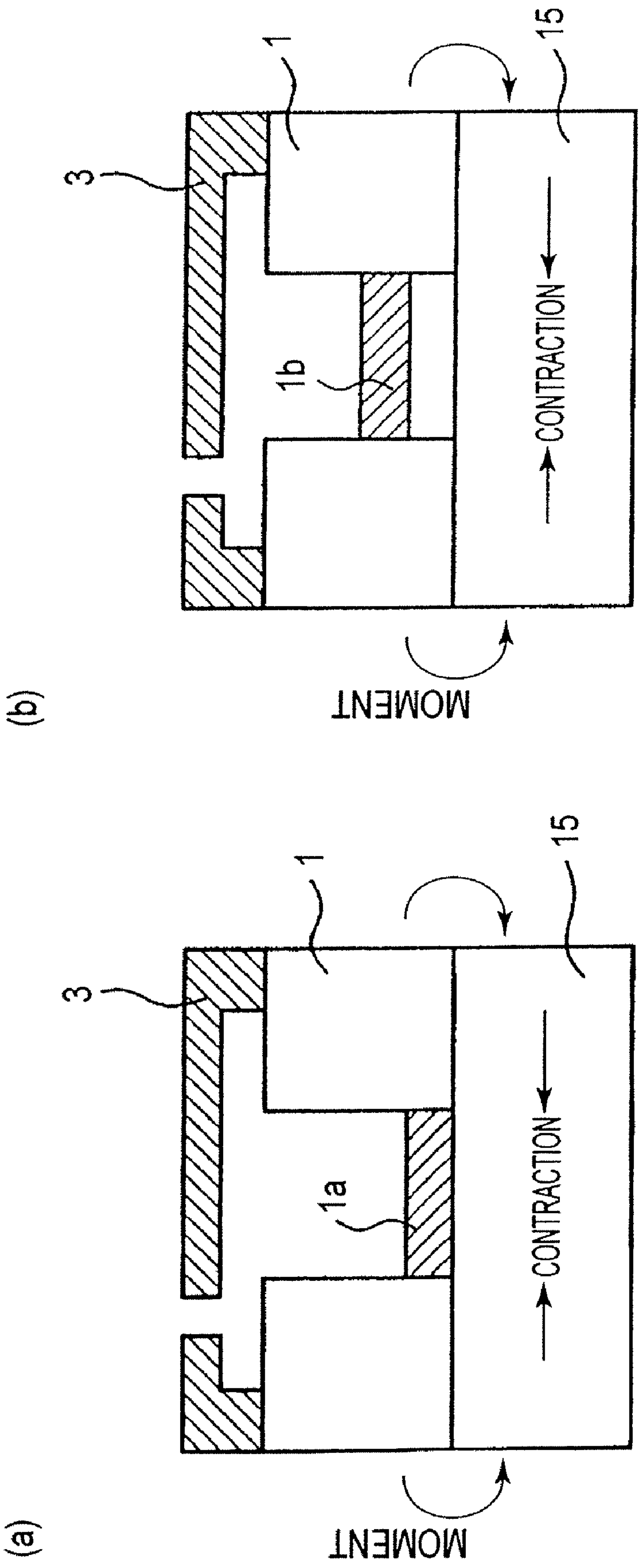
FIG. 3 is a schematic drawing for describing the method for improving the ink jet recording head in terms of mechanical strength, with the provision of beams.

Next, referring to FIG. 3, what occurs as the ink jet recording head in accordance with the present invention is solidly bonded to the liquid passage plate, and the effects thereof, will be described in detail. FIG. 3 is a schematic drawing for describing the increase in the mechanical strength of the ink jet recording head attributable to the provision of the beam 1$a$. The ink jet recording head in FIG. 3($a$) is virtually identical in structure to the ink jet recording head 20 shown in FIG. 2, and is provided with a beam 1$a$, which is located on the back side of the substrate 1. The ink jet recording head in FIG. 3($b$) is also provided with a beam 1$b$, which is located roughly in the middle of the head in its thickness direction.

Both the ink jet recording heads in FIGS. 3($a$) and 3($b$) are pasted to the corresponding liquid passage plates 15, respectively, formed of resin. As the glue for bonding the ink jet recording heads to the corresponding liquid passage plates 15, adhesive made of thermosetting resin is used. Since the ink jet recording heads are bonded to the liquid passage plates with the use of adhesive made of thermosetting resin, the liquid passage plate gradually contracts as its temperature returns to the normal one after the bonding. Since the material for the substrate 1 is silicon, whereas the material of the liquid passage plate is resin, a substantial amount of shearing stress is generated between the substrate 1 and liquid passage plate 15, and this stress sometimes causes the substrate 1 to deform or break.

To compare in structure the ink jet recording head in FIG. 3($a$) and ink jet recording head in FIG. 3($b$), in the case of the head in FIG. 3($a$), one of the lateral surfaces of the beam 1$a$ coincides with the back surface of the substrate 1. Therefore, the head in FIG. 3($a$) is greater in the size of the area by which it is bonded to the liquid passage plate 15 than the head in FIG. 3($b$), being therefore more resistant to the abovementioned shearing stress. Regardless of the presence or absence of shearing stress, being greater in the size of the bonding area is desirable from the standpoint of increase in bond strength. In comparison, in the case of the ink jet recording head in FIG. 3($b$), the head is greater in strength compared to the one which is not provided with the beam 1$b$. However, compared to the head in FIG. 3($a$), it is smaller in the size of the bonding area, being therefore less resistant to the shearing stress.

Hereinafter, the manufacturing methods for the reinforcement beam for an ink jet recording head, and an ink jet recording head, in accordance with the present invention will be described with reference to the second to seventh embodiments of the present invention. In the following embodiments of the present invention, in order to simplify the descriptions thereof, the structural components, members, portions, etc., identical in function, will be given the same referential symbols as those given in FIGS. 1 and 2, and will not be described in detail. Further, the heat generating members, wiring for driving the heat generating members, and ink passages to the ejection orifices, which are on the substrate, in the following embodiments, will not be illustrated, and the steps for forming the heat generating members and wiring will not be described.

Figure 4:
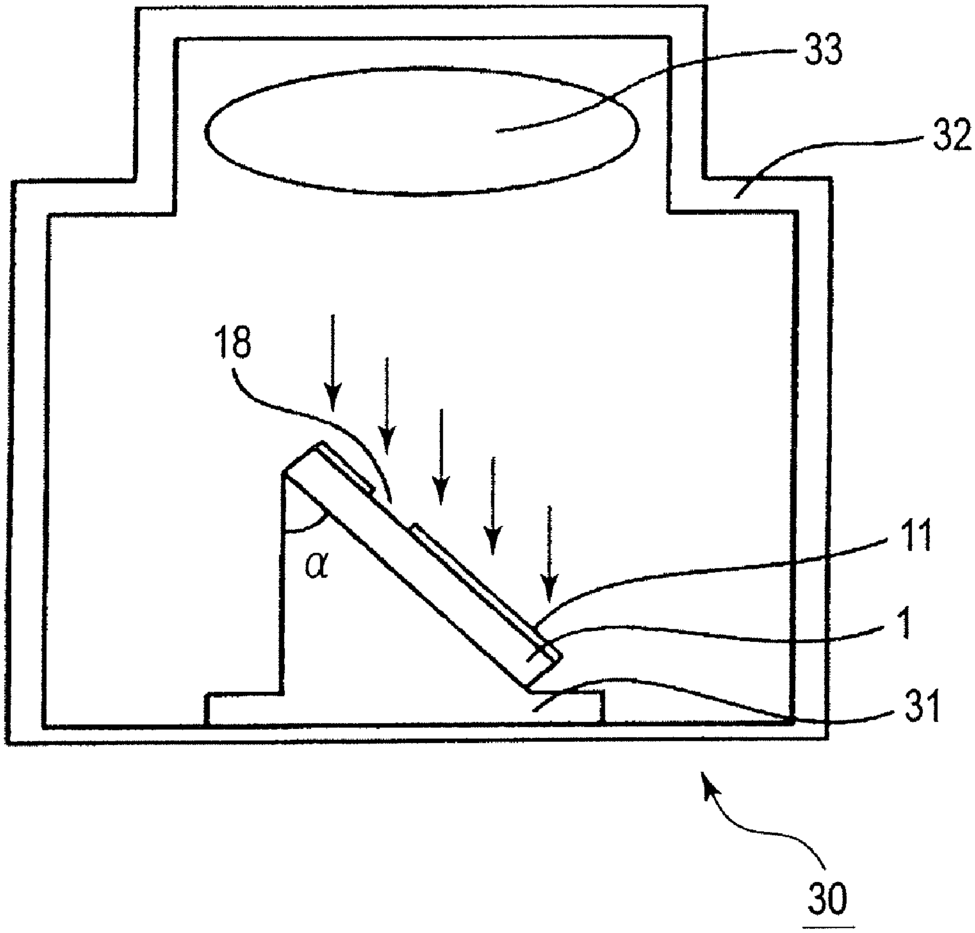
FIG. 4 is a schematic drawing of the apparatus for angularly etching a substrate, which is used for the ink jet head manufacturing method in accordance with the present invention.
Figure 5:
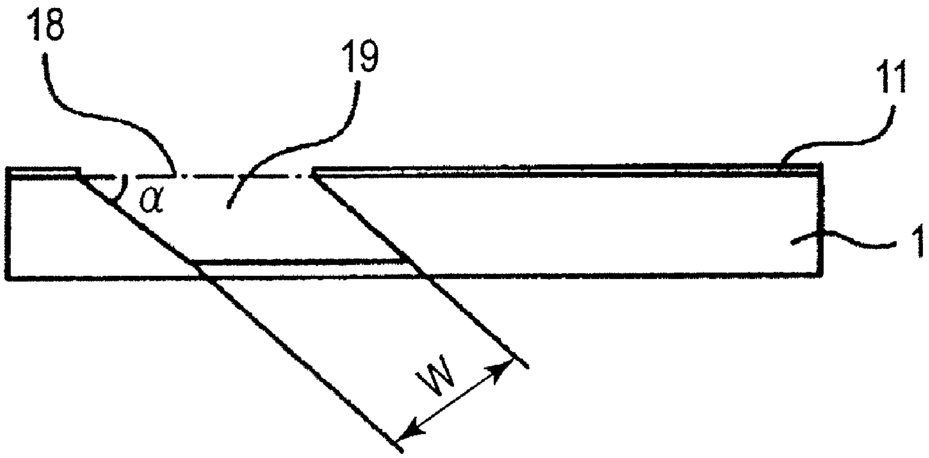
FIG. 5 is a sectional view of the substrate, which was etched with the use of the apparatus shown in FIG. 4.

First, referring to FIGS. 4 and 5, "angular etching method", or the technology to be used in the seventh embodiment, that is, the method for etching a substrate at an angle relative to the primary surface of the substrate, will be described. FIG. 4 is a schematic drawing of the apparatus used for performing "angularly etching method" used for the ink jet head manufacturing method in accordance with the present invention. FIG. 5 is a sectional view of the substrate 1 etched by such an etching method.

The etching apparatus 30, shown in FIG. 4, for angularly etching the substrate 1 comprises: an ordinary etching apparatus, which uses plasma to etch an object in a vacuum container 32 for forming a vacuumed space; and a jig (holder) 31 placed in the ordinary etching apparatus in order to hold an object (substrate 1) at an angle.

The etching apparatus 30 is structured so that the plasma generated in the plasma generating portion 33, in the upper portion of the internal space of the vacuum container 32 advances downward. The object is etched in the direction in which the plasma advances. The substrate holding jig 31 is structured so that it can hold the object (substrate 1) at an angle of árelative to the plasma advancement direction.

The substrate 1 covered with a mask 11 is placed on the substrate holding jig 31 as shown in the drawing, and plasma is generated to etch the substrate 1. As the plasma advances, the substrate 1 is etched at an angle, as shown in FIG. 5, by the plasma which comes into contact with the substrate 1 through the hole 18 of the mask 11. As a result, a groove 19 is formed. The side walls of the groove 19 hold the angle of árelative to the primary surface of the substrate 1, and the groove 19 is roughly uniform in width (w).

The substrate 1 formed of silicon can be etched at a predetermined angle with the use of atoms of any of carbon, chloride, sulfur, fluorine, oxygen, hydrogen, and argon, or reactive gaseous molecules of any of the preceding elements.

Embodiment 2

Next, referring to FIGS. 6 and 7, the method for manufacturing the ink jet recording head and the reinforcement beam therefor, in the first embodiment of the present invention will be described. The manufacturing method, which will be described next, is the manufacturing method for the ink jet recording head 21 shown in FIG. 6(*i*).

The ink jet recording head 21 comprises a substrate 1, and an orifice plate 3 having a plurality of ejection orifices (unshown) and placed on the substrate 1, as does the ink jet recording head shown in FIGS. 1-3. The substrate 1 of the ink jet recording head 21 is provided with three reinforcement beams 1*a* similar in configuration to the one shown in FIG. 2(*b*).

The common liquid chamber 9 extends from one end of the substrate 1 to the other, and has one opening (ink supplying hole 2), which faces the front side of the substrate 1. The ink supplying hole 2 is connected to the ink passages (unshown) on the inward side of the orifice plate 3. With the provision of this structural arrangement, the ink supplied from the common liquid chamber 9 is supplied to each of the ejection orifices (unshown) through the corresponding ink passage.

The side walls of the common liquid chamber 9 are formed of the same substance as that of which the substrate 1 is formed, and are parallel to the (111) face of the substrate material.

On the front and back surfaces of the substrate 1, there partially remain the layers used during some of the manufacturing steps. The back surface of the substrate 1 is covered with a beam protecting layer 14, and the front surface of the substrate 1 is covered with the passivation layer 12, which is between the substrate 1 and orifice plate 3. The passivation layer 12 is a layer needed during the formation of the ink passages 6, and is resistant to certain types of etching.

The ink jet recording head 21 structured as described above is manufactured through the following steps. First, a precursor 21*a* such as the one shown in FIG. 6(*a*) is formed.

The precursor 21*a* comprises: the substrate 1; the passivation layer 12 formed on the front (top) surface of the substrate 1; a dissolvable resin layer 13 partially covering the passivation layer 12; and the orifice plate 3 placed on the passivation layer 12 in a manner of covering the dissolvable resin layer 13. The precursor 21*a* also comprises a first mask 11*a* having three holes 18*a* and placed on the back surface of the substrate 1. The distances among the three holes 18*a* have been adjusted so that they roughly match the width of the bottom surface of the beam 1*a*.

To describe in more detail, the precursor 21*a* is formed through the following steps.

First, a silicon substrate is prepared, which has a predetermined thickness, and the primary surface of which is parallel to the (100) face of the silicon crystal. Then, the entire surface of the substrate 1 is oxidized using oxidization gas, forming a silicon dioxide layer across both the front (top) and back (bottom) surfaces of the substrate 1. Then, the silicon dioxide layer is removed in entirety from the back side of the substrate 1 with the use of buffered hydrofluoric acid. During this process, a portion of the layer of the thermally oxidized silicon on the front surface of the substrate 1, more specifically, the portion corresponding to the ink supplying hole 2, is removed by the buffered hydrofluoric acid.

Then, a film of silicon nitride is formed as the passivation layer 12 on the front side of the substrate 1 by LPCVD (low pressure chemical vapor deposition). During this process, a silicon nitride film is also formed on the back side of the substrate 1. However, this silicon nitride film (unshown) on the back side is removed; it can be removed by the etching method which uses reactive gaseous ions of $CF_4$, for example.

Next, the resin layer 13 is formed in the pattern of ink passages (unshown), on the passivation layer 12.

Next, the orifice plate 3 is solidly attached to the substrate 1 (passivation layer 12), being precisely positioned so that it covers the resin layer 13.

Next, the first mask 11*a* is formed of photosensitive resist, on the back surface of the substrate 1, from which silicon is exposed, and the first holes 18 are formed.

The precursor 21*a* is completed through the above described sequential steps.

Figure 6:
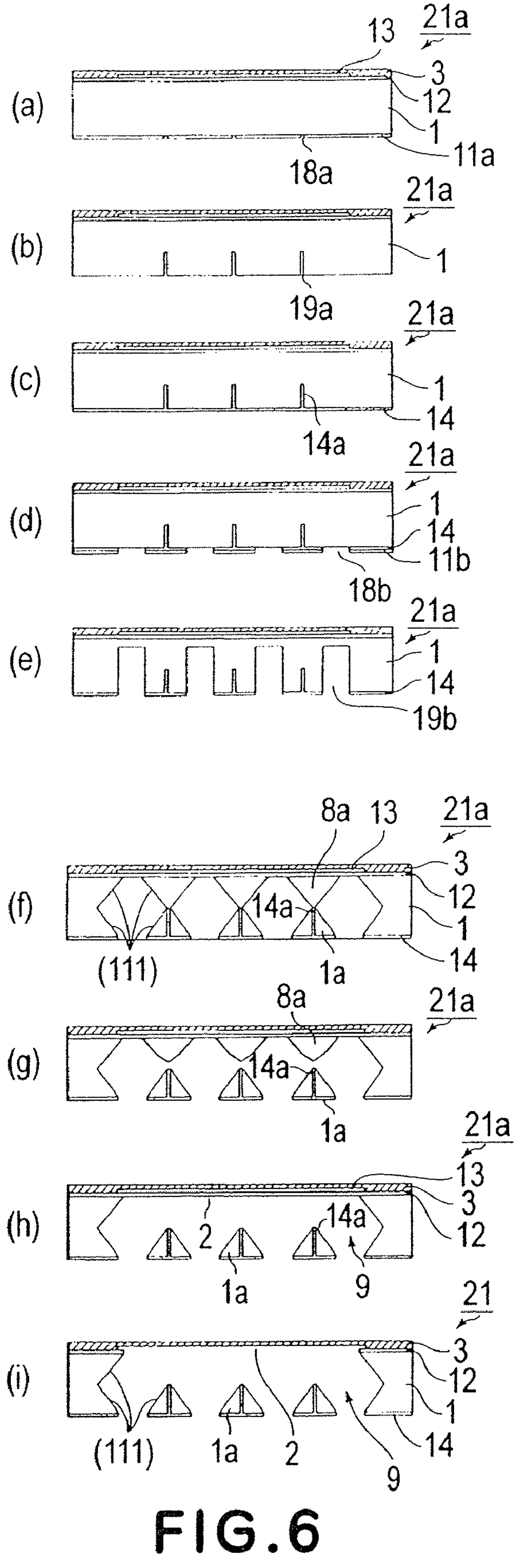
FIG. 6 is a drawing for describing the ink jet head manufacturing method in the second embodiment of the present invention.
Figure 7:
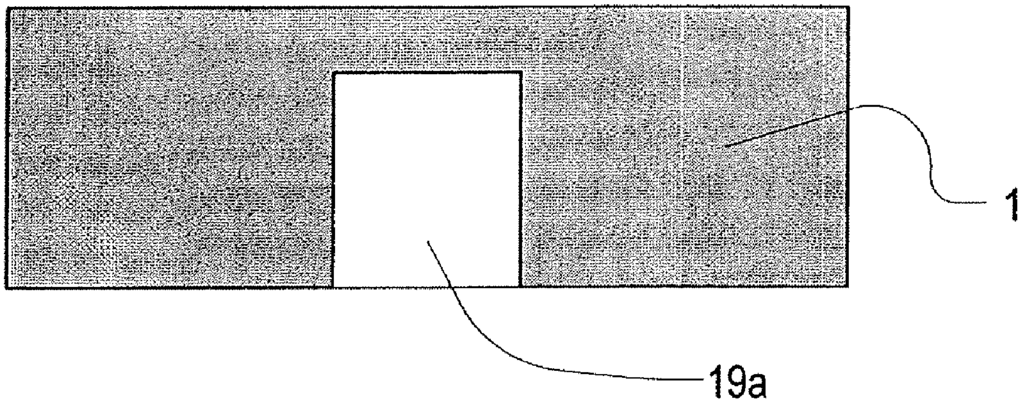
FIG. 7 is an enlarged sectional view of the groove portion, for supplementing the description of the beam forming method in accordance with the present invention.
Figure 7:
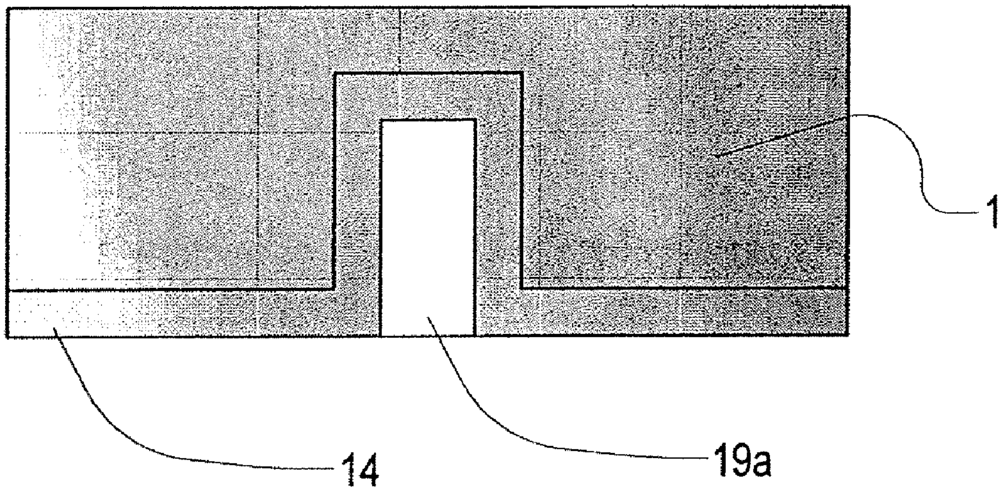

Next, first grooves 19*a* are formed as shown in FIG. 6(*b*). More specifically, first, the substrate 1 is etched with the use of reactive gaseous ions of $SF_6$ from the back side, to form the first grooves 19*a* having a predetermined depth. Incidentally, the opposing two lateral surfaces of each first groove 19*a* are parallel to each other. Thereafter, the first mask 11*a* is removed by ashing, which uses $O_2$ gas.

Next, silicon nitrate is formed by the plasma CVD, in each first groove 19*a* and across the entirety of the back surface of the substrate I, forming the projections 14*a* and beam protection layer 14, as shown in FIG. 6(*c*). Each projection 14*a* in FIG. 6 is formed by filling each first groove 19*a* with silicon nitride. However, it may be formed by covering the surfaces of each first groove 19*a* with silicon nitride (protective member 14) as shown, in enlargement, in FIGS. 7(*a*) and 7(*b*). FIG. 7(*a*) is an enlarged sectional view of one of the first grooves 19*a* and its adjacencies in the state shown in FIG. 6(*b*), and FIG. 7(*b*) is an enlarged sectional view of the first groove 19*a* and its adjacencies in the state shown in FIG. 6(*c*).

Next, a second mask 11*b* is formed of photoresist, on the beam protection layer 14, and the portions of the beam protection layer 14 exposed through the patterned second mask 11*b* are removed with the use of solution, the primary ingredient of which is phosphoric acid, in order to form four second holes 18*b*, as shown in FIG. 6(*d*).

Next, the substrate 1 is etched from the back side, with the use of reactive gaseous ions of $SF_6$, forming four second holes 19*b* having a predetermined depth, as shown in FIG. 6(*e*). The remaining second mask 11*b* is removed by ashing, with uses $O_2$ gas.

Next, referring to FIG. 6(*f*), the substrate 1 is anisotropically etched from the walls of each second groove 19*b* with the use of water solution of TMAH (tetra-methyl ammonium hydroxide). As a result, the substrate 1 is etched in a manner to expose the (111) face of the substrate 1, leaving the portions 8*a*, which are triangular in cross section, above the beams 1*a*.

Next, referring to FIG. 6(*g*), as this etching process is allowed to continue, only the portions 8*a* are etched, whereas the beams 1*a* are scarcely etched for the following reason. That is, each beam 1*a* has the projection 14*a*, which is in the center of the beam 1*a*, and once the tip of each projection 14*a* is exposed by etching, it prevents the beam 1*a* from being etched further. The occurrence of this phenomenon means that the completed beam 1*a* is resistant to corrosion; the beam 1*a* is unlikely to be etched, because the tip of the projection 14*a* is exposed at the top of the beam 1*a*.

In the last step, the portions 8*a* are entirely removed, leaving only the beams 1*a* standing on the back side of the substrate 1, as shown in FIG. 6(*h*). As a result, the common liquid chamber 9, which extends from one end of the substrate 1 to the other, is formed. The opening of the common liquid chamber 9, on the front side of the substrate 1, serves as the ink supplying hole 2.

Next, the passivation layer 12 is etched away through the ink supplying hole 2, with the use of the reactive gaseous ions of $CF_4$, and the resin layer 13 is dissolved away with the solvent capable of dissolving the resin layer 13. As a result, ink passages (unshown) are formed, as shown in FIG. 6(I).

Through the above described sequential steps, the ink jet recording head 21 is manufactured.

To describe in more detail, each of the structural portions of the ink jet recording head 21, and each of the above described steps for manufacturing the ink jet recording head 21, may be as follows:

The configuration and size of the beams 1*a* can be controlled by modifying the configurations of the first groove 19*a* or second mask 11*b*. When a substrate, the primary surface of which is parallel to the (100) face of the silicon crystal of which the substrate is made, is used to manufacture the ink jet recording head, there is the following relationship between the depth D of the first groove 19*a* and the width W of the second mask 11*b*, because the angle between the (100) face and (111) face is 54.7°:2 D=Wùtan 54.70°. Thus, the configuration and size of the beam 1*a* can be adjusted by calculating the measurements of the first groove 19*a* and second mask 11*b*.

Further, even when a substrate (1), the primary surface of which is parallel to the (110) face of the silicon crystal, is used, the configuration and size of the beam 1*a*, in which the beam 1 will be after the anisotropic etching, can be controlled based on the angle between the (110) face and (111) face of the substrate (1).

Further, although the beam 1*a* has the beam protection layer 14 and projection 14*a*, they may be removed if necessary. The removal of the beam protection layer 14 and projection 14*a* makes it possible to divide a single beam 1*a* into multiple beams 1*a* (two in the case of ink jet recording head 21 in FIG. 6).

The material for the first mask 11*a* has only to be resistant to the step for forming the first groove 19*a*. For example, inorganic film such as thermally oxidized film may be used in place of such organic film as photoresist.

As for the etching method for forming the first groove 19*a* and second groove 19*b*, any of the following methods may be used: wet etching, plasma etching, sputter etching, ion milling, laser abrasion based on excimer laser, YAG laser, or the like, sand blasting, etc., instead of reactive ion etching.

The materials for the beam protection layer 14 and projection 14*a* do not need to be limited to the aforementioned substances, as long as the substances are resistant to anisotropic etching. In particular, when the beam 1*a* having the beam protection layer 14 is formed in an ink jet recording head, it is desired that a substance resistant to ink is selected as the material for the beam protection layer 14 and projection 14*a*. As for such materials, there are film of inorganic substance such as metal, oxide, nitride, etc., and film of organic substance such as resin. More specifically, Ti, Zr, Hf, V, Cr, Mo, W, Mn, Co, Ni, Ru, Os, Rh, Ir, Pd, Pt, Ag, Au, Ge, silicon compound, and polyether-amide resin, can be used.

The beam protection layer 14 and projection 14*a* may be formed by thermally oxidizing the surface of the substrate 1 after the formation of the first groove 19*a*. Further, they may be formed with the use of such film forming methods as vapor deposition, sputtering, plating, spin coating, burr coating, dip coating, etc., instead of the abovementioned CVD.

The material for the passivation layer 12 does not need to be limited to the abovementioned one, as long as it is resistant to the etching method for forming the common liquid chamber 9. Further, in consideration of the fact that the second groove 19*b* reaches the passivation layer 12, the passivation layer 12 needs to be resistant to the etching process for forming the second groove 19*b*. As for the method for forming the passivation layer 12, such a conventional method as the vapor deposition, sputtering, chemical vapor phase epitaxy, plating, or thin film forming technology such as thin film coating, or the like, may be used.

As for the etching method for forming the common liquid chamber 9, the method for anisotropically etching the silicon substrate 1 with the use of water solution of alkali as etchant may be used. Instead of TMAH, one among such etching liquids as KOH, EDP, hydrazine, or the like, the etching rate of which are affected by the face orientation of crystal, may be used. In any case, the ink supplying opening 2 can be precisely formed in terms of width (configuration) by using an etching method capable of anisotropically etching the silicon crystal.

As the method for forming the common liquid chamber 9 which extends through the substrate 1, a sacrifice layer, the pattern and size of which matches the desired pattern and size of the ink supplying opening 2, may be formed on the bottom surface of the passivation layer 12. In such a case, in order to assure that while the silicon substrate 1 is etched for the formation of the common liquid chamber 9, the sacrifice layer and the silicon (residual portion) immediately below the sacrifice layer are simultaneously etched, the sacrifice layer is to be formed of a substance that is isotropically etched by the etching liquid for forming the common liquid chamber 9. When the abovementioned process is used, in which the sacrifice layer, which determines the shape in which the opening of the common liquid chamber 9 is formed, is formed on the substrate 1, and then, the passivation layer 12 is formed on the sacrifice layer, it is possible to prevent the problem that when the substrate 1 is etched from the back side thereof, the ink supplying opening of the common liquid chamber 9 is inaccurately formed in shape and size, because of the deviation in the thickness of the substrate 1, crystalline defects in the silicon crystal of which the substrate 1 is made, deviation in OF angle, deviation in the density of the etching liquid, or the like factors; in other words, it is possible to control the shape and size of the ink supplying hole 2 by controlling the pattern of the sacrifice layer.

As the material for the sacrifice layer, various substances, for example, semiconductive substances, dielectric substances, metallic substances, etc., can be used, as long as they are isotropically etched by the etchant used for anisotropically etching silicon crystal, and also, can be formed into thin film. More specifically, such semiconductors as polycrystalline silicon, porous crystalline silicon, and the like, such a metallic substance as aluminum, such a dielectric substance as ZnO, and the like, which are dissolvable into water solution of alkali, are preferable. In particular, polycrystalline silicon film is preferable as the material for the sacrifice layer, because it is superior in terms of the compatibility with an LSI process, and is higher in reproducibility. The sacrifice layer may be as thin as the thinnest film formable with the use of a selected material. For example, when the sacrifice layer is formed of polycrystalline silicon, in a thickness of roughly several hundreds of angstroms, the sacrifice layer can be isotropically etched at the same time as the substrate 1 is anisotropically etched.

Embodiment 3

Figure 8:
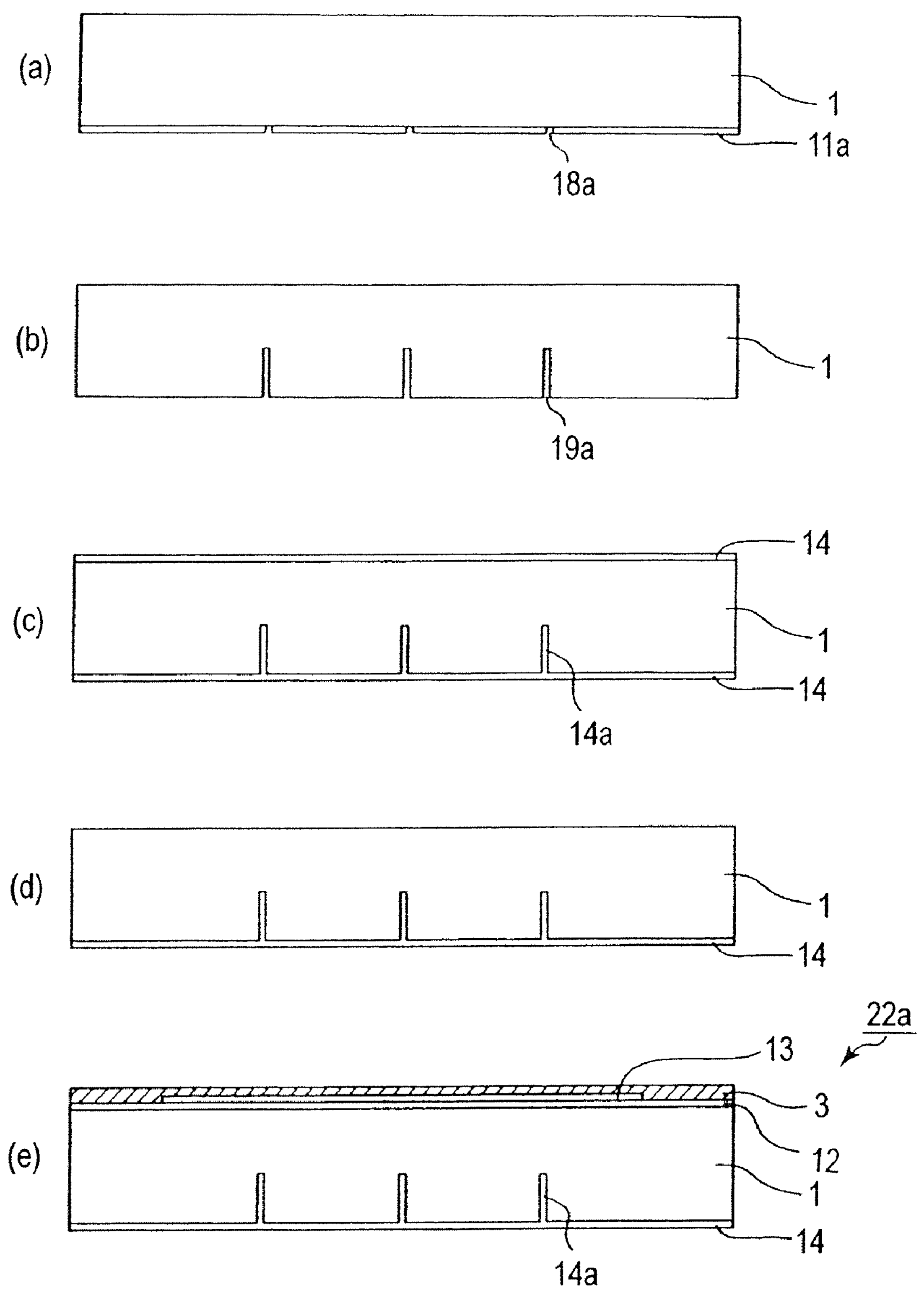
FIG. 8 is a drawing for describing the ink jet head manufacturing method in the third embodiment of the present invention.

Referring to FIG. 8, the method for manufacturing the ink jet recording head and the reinforcement beam therefor, in another embodiment of the present invention, will be described. The manufacturing method which will be described next is for the ink jet recording head (unshown) similar to the ink jet recording head 21 shown in FIG. 6(I), except that the beam protective layer 14 and projections 14*a* of the ink jet recording head in this embodiment are formed of silicon dioxide instead of silicon nitride. The precursor 22*a* shown in FIG. 8(*e*) is identical in configuration to the precursor 21*a* shown in FIG. 6(*c*); the former is different from the latter only in the material for the beam protection layer 14. Thus, the manufacturing steps performed after the step for forming the beam protection layer 14 are the same as the steps performed after the step used for forming the intermediate product shown in FIG. 6(*d*), and therefore, they will not be described.

The process for manufacturing the precursor 22*a* is as follows:

First, the substrate 1 is prepared, and the first mask 11*a* is formed on the back surface of the substrate 1, as shown in FIG. 8(*a*), through the same step as the step used for forming the precursor 21*a* shown in FIG. 6(*a*).

Next, the first grooves 19*a* are formed, as shown in FIG. 8(*b*), through the same step as the step used for forming the intermediate product shown in FIG. 6(*b*).

Next, the entirety of the surfaces of the substrate 1 are thermally oxidized with the use of oxidization gas. As a result, not only is a film 14 of silicon dioxide formed on both the front and back surfaces of the substrate 1, but also, the projection 14*a* is formed of silicon dioxide, in each of the first grooves 19*a*, as shown in FIG. 8(*c*).

Next, the portion of the film 14 on the front surface of the substrate 1, which corresponds to the ink supplying opening (unshown), is removed with the use of buffered hydrofluoric acid, as shown in FIG. 8(*d*).

Next, the passivation layer 12, resin layer 13, and orifice plate 3 are sequentially formed, as shown in FIG. 8(*e*), through the same manufacturing steps as those used for preparing the precursor 21*a* shown in FIG. 6(*a*).

Through the above described sequential steps, the precursor 22*a* (FIG. 8(*e*)), the state of which is virtually identical to that of the precursor 21*a* shown in FIG. 6(*c*), is formed. This precursor 22*a* is used to manufacture the ink jet recording head (unshown) in this embodiment, through the same steps as those carried out after the step used for forming the intermediate product shown in FIG. 6(*d*).

Embodiment 4

Next, referring to FIG. 9, the method for manufacturing the ink jet recording head and the reinforcement beam therefor, in another embodiment of the present invention will be described. The manufacturing method which will be described next is for the ink jet recording head (unshown), which has the first mask 11*a* between the substrate 1 and beam protection film 14. The process for manufacturing the precursor 23*a* shown in FIG. 9(*e*) is for forming this ink jet recording head (unshown), and is in the same state as the state of the precursor 21*a* shown in FIG. 6(*e*), that is, the first mask 11*a* has been formed between the substrate 1 and beam protection layer 14. The manufacturing steps carried out after the step used for forming the intermediate product shown in FIG. 9(*e*) are the same as those carried out after the step used for forming the intermediate product shown in FIG. 6(*e*), and therefore, will not be described.

Figure 9:
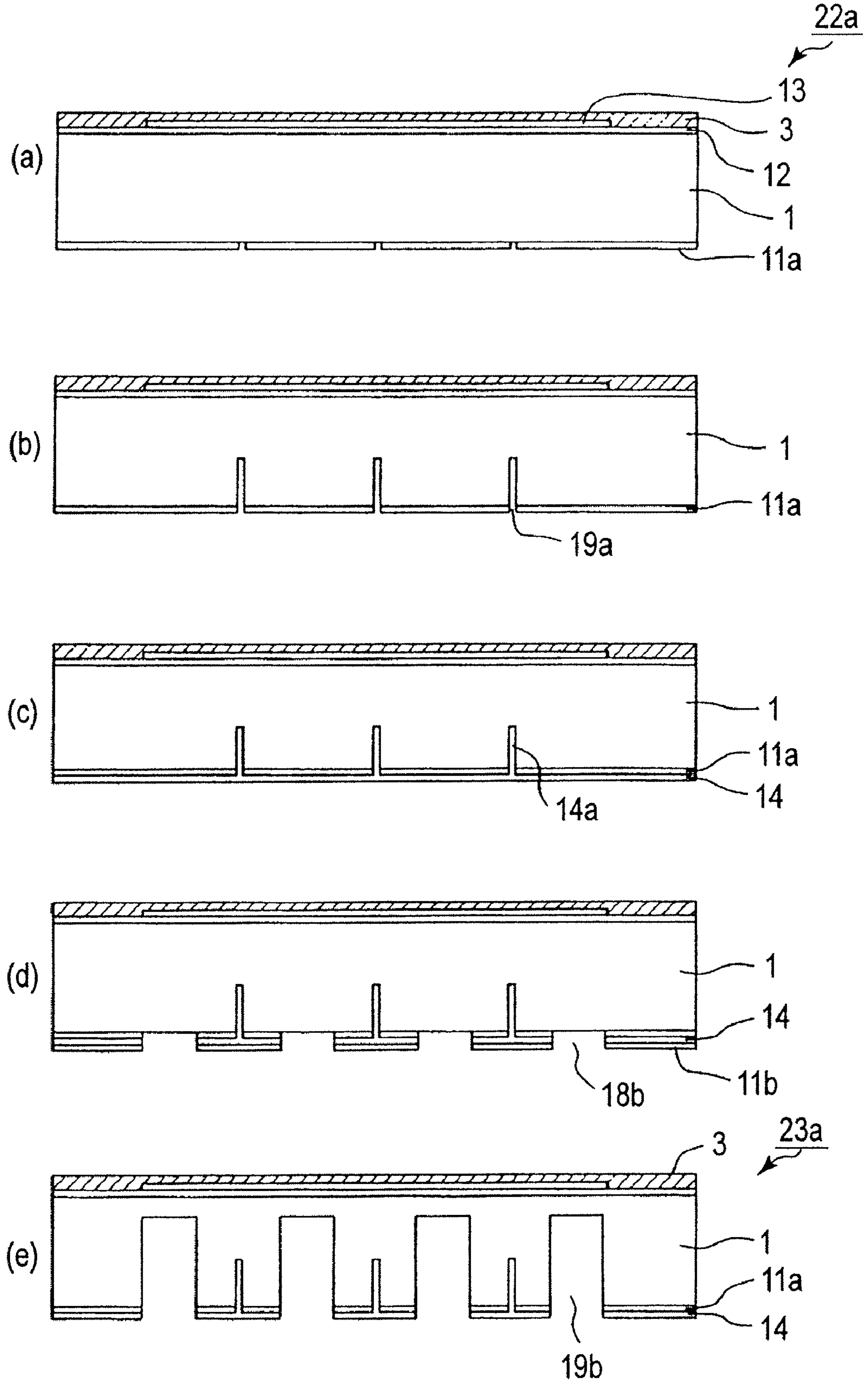
FIG. 9 is a drawing for describing the ink jet head manufacturing method in the fourth embodiment of the present invention.

First, referring to FIG. 9(*a*), the precursor 23*a* is prepared through the same steps as those used for forming the precursor 21*a* shown in FIG. 6(*a*).

The precursor 23*a* is identical in configuration to the precursor 21*a* shown in FIG. 6(*a*). However, the first mask 11*a* of this precursor 23*a* is formed of polyether-amide resin, which is resistant to the anisotropic etching. The first mask 11*a* is used as the mask for the anisotropic etching process, which will be described later.

Next, the first grooves 19*a* are formed, as shown in FIG. 9(*b*), through the same step as the step used for forming the intermediate product shown in FIG. 6(*b*).

Next, the projections 14*a* are formed of resin inside of each first groove 19*a*, and the beam protection film 14 is formed of resin film on the first mask 11*a*, by a bar code method, as shown in FIG. 9(*c*). In the step used for forming the intermediate product shown in FIG. 6(*c*), which was described in the description of the second embodiment, the projections 14*a* and beam protection layer 14 are formed of silicon nitride, with the use of CVD. In comparison, the projections 14*a* and beam protection layer 14 in this embodiment are formed of resinous substance as described above.

Next, the second mask 11*b* having the second holes 18*b* is formed on the beam protection layer 14, as shown in FIG. 9(*d*), through the same steps as those used to form the intermediate product shown in FIG. 6(*d*).

Next, the second grooves 19*b* are formed, as shown in FIG. 9(*e*), through the same step as the one used for forming the intermediate product shown in FIG. 6(*e*).

Through the above described sequential steps, the precursor 23*a* (FIG. 9(*e*)), the state of which is roughly the same as that of the precursor 21*a* shown in FIG. 6(*e*), is formed. Then, the precursor 23*a* is used to manufacture the ink jet recording head (unshown) in this embodiment through the same steps as the steps carried out after the step used for forming the intermediate product shown in FIG. 6(*e*).

As will be evident from the above description of the preferred embodiments of the present invention, the beam protection layer 14 and projections 14*a* can be varied in material.

The material for beam protection layer 14 and projections 14*a* may be a metallic substance (Pt, for example), instead of being one of the resins mentioned above. When the beam protection layer 14 and projections 14*a* are formed of a metallic substance, they may be formed by sputtering.

The shape in which the beam in this embodiment is form can be controlled by modifying the shapes of the beam protection film and projections. Next, examples of beams different in shape from the beams in the preceding embodiments will be described.

Embodiment 5

It is possible to form a beam, which is pentagonal in cross section, by adjusting the first grooves in depth, and the width of the bottom of the beam.

Next, referring to FIG. 10, the method usable for manufacturing an ink jet recording head, the beams of which are pentagonal in cross section, will be described. The manufacturing method, which will be described next, is for manufacturing the ink jet recording head 24 shown in FIG. 10(*e*).

Figure 10:
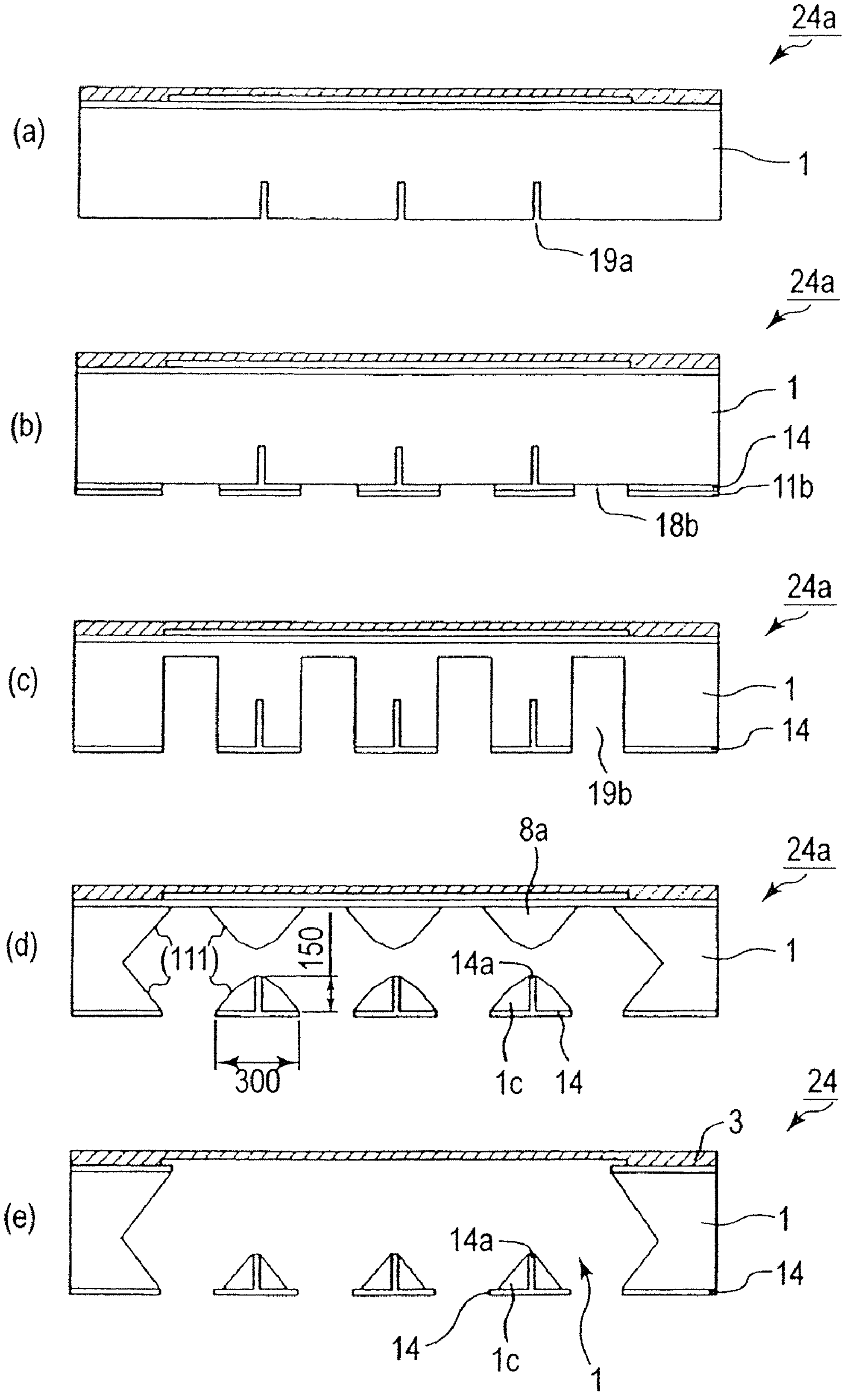
FIG. 10 is a drawing for describing the ink jet head manufacturing method in the fifth embodiment of the present invention.

First, a precursor 24*a* in the state shown in FIG. 10(*a*) is formed through the steps similar to the steps used for forming the intermediate products shown in FIGS. 6(*a*) and 6(*b*).

Compared to the grooves 19*a* of the precursor 21*a* in the state shown in FIG. 6(*b*), the grooves 19*a* of the precursor 24*a* in the state shown in FIG. 10(*a*) are shallower, being 150 μm, for example, in depth.

Next, the precursor 24*a* in the state shown in FIG. 10(*b*) is formed through the same steps as the steps used to form the precursor 21*a* into the states shown in FIGS. 6(*c*) and 6(*d*). The state of the precursor 24*a* shown in FIG. 10(*b*) is the same as the state of the precursor 21*a* shown in FIG. 6(*d*); in other words, the second holes 18*b* have been formed. The distance between the adjacent two holes 18*a*, that is, the width of the portion of the mask 11*b* for controlling the width of the bottom of each beam 1*c*, is 300 μm, for example.

Next, the second grooves 19*b* shown in FIG. 10(*c*) are formed through the step used for forming the precursor 21*a* into the state shown in FIG. 6(*e*).

Next, the substrate 1 is anisotropically etched from the walls of each of the second grooves 19*b* through the same steps as those used for forming the precursor 21*a* into the states shown in FIGS. 6(*f*) and 6(*g*). As a result, the beams 1*c*, shown in FIG. 10(*d*), which are pentagonal in cross section, are formed. The reason why the beams 1*c* are formed so that they become pentagonal in cross section is that the height of each projection 14*a* is less than the width of the bottom of the corresponding beam 1*c*. In other words, one of the characteristics of the anisotropic etching that the anisotropic etching progresses in the direction of exposing the (111) face of the silicon crystal, is utilized to form the beams 1*c* which are pentagonal in cross section.

Next, the same step as the step used for forming the precursor 21*a* shown in FIG. 6(*h*) is continued to form the precursor 24*a* in the state shown in FIG. 10(*e*), which has the beams 1*a* which are roughly triangular in cross section, and the common liquid chamber 9. As a result, the ink jet recording head 24, which is identical in structure to the ink jet recording head 21 shown in FIG. 6(I), is formed.

Embodiment 6

As will be evident from the description of the preceding embodiments, the shape in which each beam 1*a* is formed in terms of cross section can be varied by adjusting in width the corresponding first groove and the width of the beam.

Next, referring to FIG. 11, the method for forming beams 1*d*, the cross sections of which are in the form of letter W placed upside down, will be described. The manufacturing method which will be described next is for manufacturing the ink jet recording head 25 shown in FIG. 11(*d*), the cross section of the beams 1*d* of which are in the form of letter W placed upside down. More specifically, the precursor of each of the beams 1*d* is triangular in cross section, and its two base angles are 54.7°. During the step for forming the beams 1*d*, the precursor of each beam 1*d*, which is triangular in cross section (FIG. 11(*c*)), is etched at an angle of 54.7°, starting from its peak. As a result, a recess is formed between the two projections in the precursor of each beam 1*d*. The surfaces of each beam 1*d*, other than the bottom surface thereof, are roughly parallel to (111) face of the substrate 1.

Figure 11:
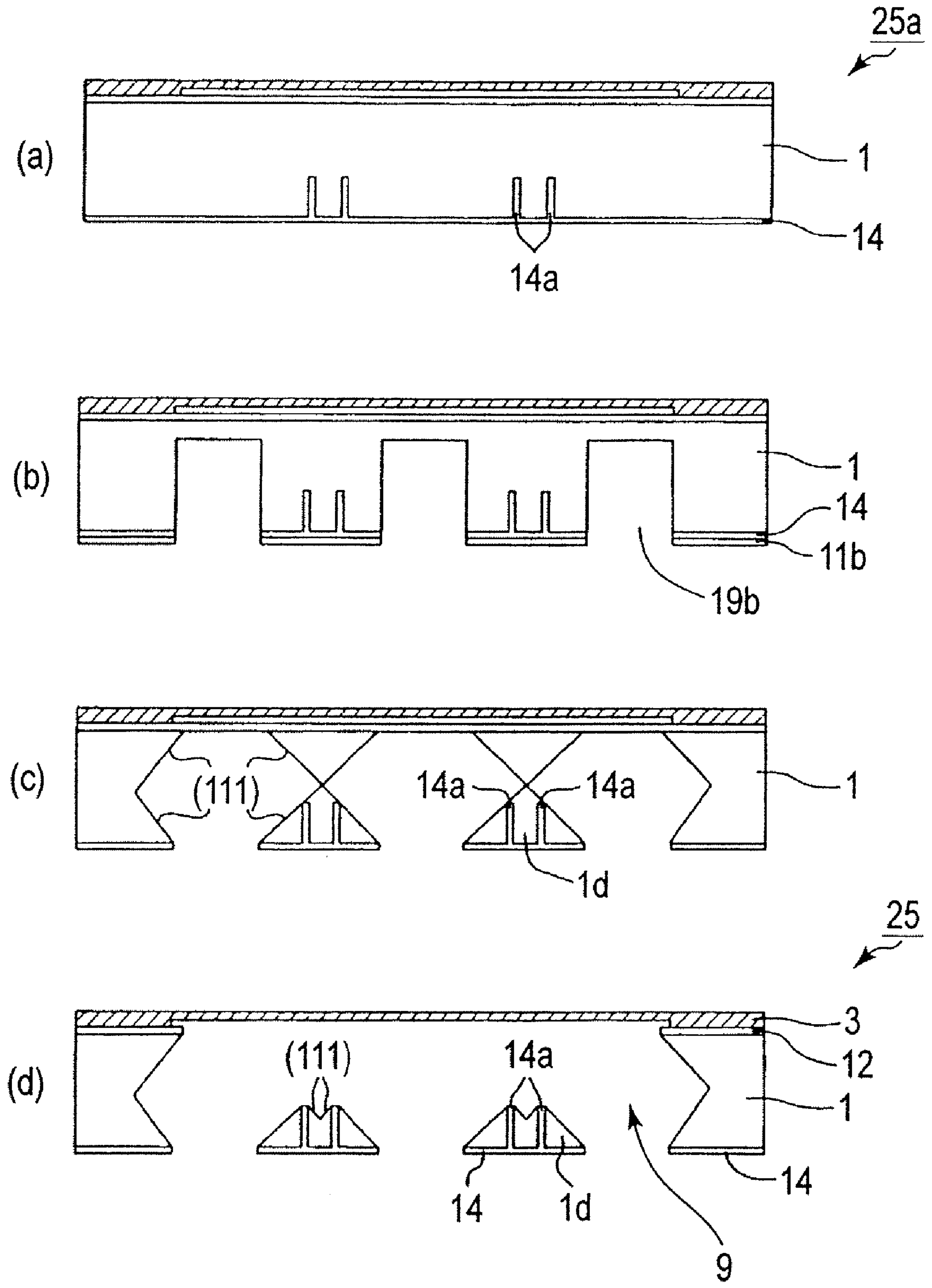
FIG. 11 is a drawing for describing the ink jet head manufacturing method in the sixth embodiment of the present invention.

First, the precursor 25*a* shown in FIG. 11(*a*) is formed through the steps similar to the steps used for forming the precursor 21*a* into the states shown in FIGS. 6(*a*)-6(*c*).

The precursor 25*a* is virtually the same as the precursor 21*a* shown in FIG. 6(*c*). It has the beam protection layer 14, which is on the back surface of the substrate 1, and two pairs of projections 14*a*, which have a predetermined depth and have been extended into the substrate 1. The paired projections 14*a* are positioned a predetermined distance apart from each other.

Next, the second grooves 19*b* shown in FIG. 11(*b*) are formed through the steps similar to the steps used for forming the precursor 21*a* into the states shown in FIGS. 6(*d*) and 6(*e*). The second grooves 19*b* are formed so that the distance between the adjacent two second grooves 19*b* becomes roughly the same as the width of the bottom of the beam 1*d*.

Next, in order to form the precursor 25*a* into the state shown in FIG. 11(*c*), the substrate 1 is etched through the steps used for forming the precursor 21*a* into the state shown in FIG. 6(*f*). The beams 1*d* in the precursor 25*a* in the state shown in FIG. 11(*c*) are triangular in cross section, and the peak of each beam 1*d* is at the center between the corresponding pair of projections 14*a*, in terms of the direction parallel to the primary surface of the substrate 1.

Next, the etching process is allowed to progress through the step similar to the step through which the precursor 21*a* is formed into the state shown in FIG. 6(*f*) to form the beams 1*d* in the shape shown in FIG. 11(*d*). As a result, the etching begins from the top of the precursor of each beam 1*d*, yielding the beam 1*d*, the cross section of which is in the form of letter W placed upside down. Further, at the same time as the precursor of each beam 1*d* is etched starting from its peak, the common liquid chamber 9 is completed. As a result, the ink jet recording head 25 in this embodiment is yielded.

The beam 1*d* in this embodiment has only one recess, which is located between the two peaks. However, the number of the recesses can be increased by increasing the number of the projections 14*a* in each set of projections 14*a*. A recess such as the one described above functions as a means for trapping the gas which adversely affects the ink ejection from an ink jet recording head.

Embodiment 7

In the above described preceding embodiments, the projections 14*a* are formed perpendicular to the substrate 1. However, it is possible to form the projections 14*a* at an angle with the use of the "angular etching method" shown in FIGS. 4 and 5. Therefore, with the use of this etching method, the number of the various shapes in which each beam is formed in terms of cross section can be substantially increased.

Next, referring to FIG. 12, the method for manufacturing an ink jet recording head provided with inclined projections will be described. The manufacturing method which will be described next is for manufacturing the ink jet recording head 26 shown in FIG. 12(*d*), the projection 14*a* in each beam 1*e* is tilted relative to the primary surface of the substrate 1.

Figure 12:
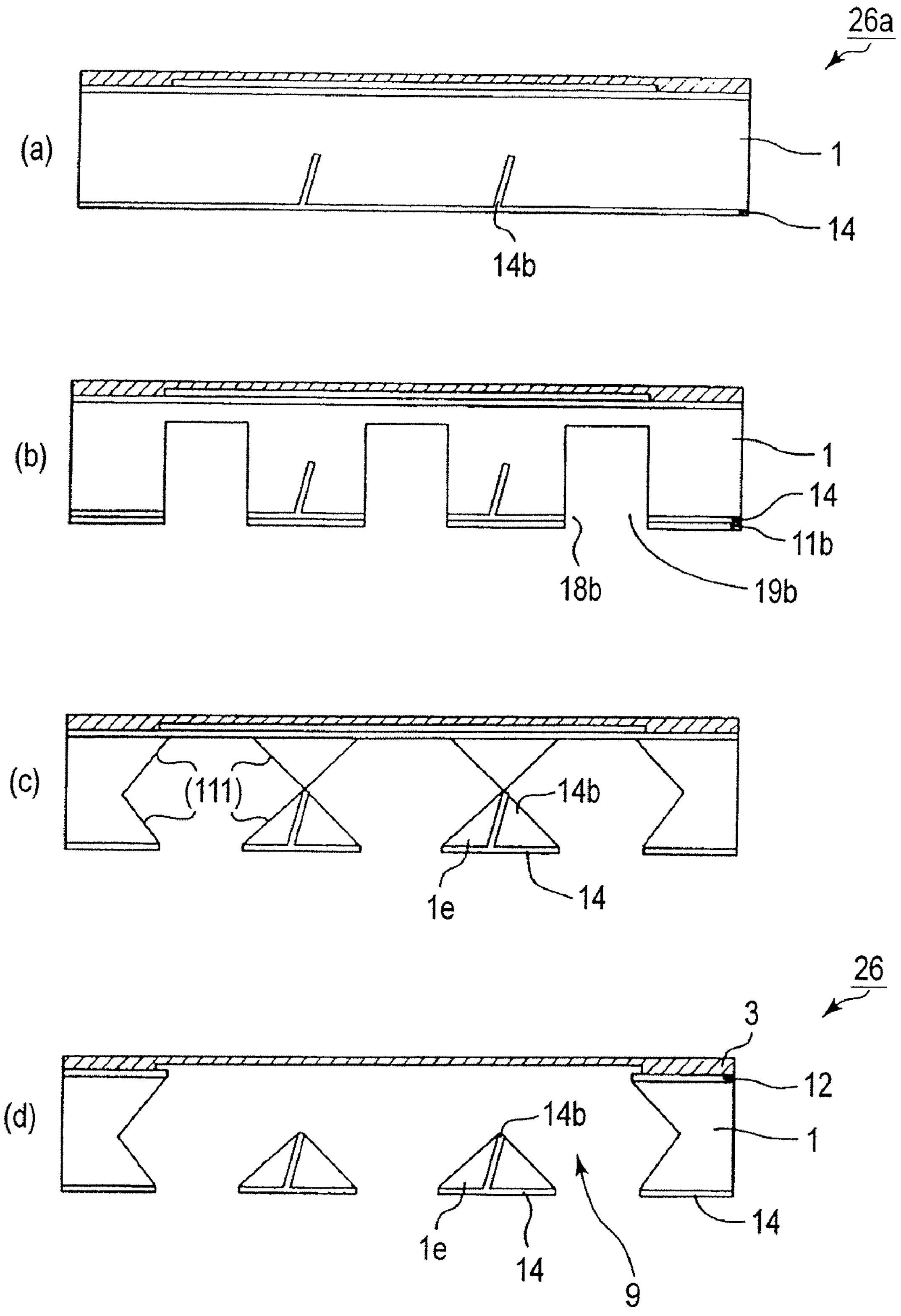
FIG. 12 is a drawing for describing the ink jet head manufacturing method in the seventh embodiment of the present invention.

First, the precursor 26*a* shown in FIG. 12(*a*) is formed through the steps roughly similar to the steps used for forming the intermediate products shown in FIGS. 6(*a*)-6(*c*), except that the first grooves (which corresponds to projection 14*b* in FIG. 12(*a*)) are formed with the use of the angularly etching apparatus 30 shown in FIG. 4.

Next, the intermediate product shown in FIG. 12(*b*) is formed by forming the second holes 18*b* through the step similar to the step used for forming the intermediate product shown in FIG. 6(*d*), and then, forming the second grooves 19*b* through the step similar to the step used for forming the intermediate product shown in FIG. 6(*e*).

Next, the substrate 1 is etched as shown in FIG. 12(*c*) through the step similar to the step used for forming the intermediate product shown in FIG. 6(*f*). As a result, the beams 1*e* are formed so that their peaks will coincide with the corresponding tips of the projections 14*b*.

Next, the etching is allowed to continue through the steps similar to the steps carried out after the step used for forming the intermediate product shown in FIG. 6(*g*). As the etching is allowed to continue, the beams 1*e* and common liquid chamber 9 are formed, yielding the ink jet recording head 26 in this embodiment shown in FIG. 12(*d*).

The ink jet recording heads 21-26 (FIG. 6-12) in the second to seventh embodiments, respectively, were manufactured, and were tested to confirm their characteristics.

For the purpose of confirming their mechanical strength, the ink jet recording heads 21-26 (FIGS. 6-12) were compared to an ink jet recording head in accordance with the prior art.

The ink jet recording head in accordance with the prior art was identical in the measurement of the ejection element to the ink jet recording heads 21-26, but was not provided with the beam. All the ink jet recording heads were subjected to destruction tests in which load is applied to them in the direction parallel to the width direction of the ink supplying hole until the substrates 1 were damaged.

None of the ink jet recording heads 21-26 in accordance with the present invention were damaged by the minimum amount of load which damaged the ink jet recording head in accordance with the prior art. In other words, these tests proved that all of the ink jet recording heads 21-26 in the preferred embodiments of the present invention were superior in mechanical strength to the ink jet recording head in accordance with the prior art.

When images were printed with the ink jet recording heads 21-26, they were uniform in refill characteristic; they were roughly identical in the distance from the ink supplying hole to the heat generating member, and refilling time.

When the beams with which the ink jet recording heads 21-26 were provided were kept in ink for three months, none of the beams changed in shape, and also, the beams 1*c* of the intermediate product (FIG. 10(*d*)) derived from the precursor 24*a* of the ink jet recording head 24 shown in FIG. 10 did not change in shape.

In the above described preferred embodiments of the present invention, the beams were formed so that they extended in the width direction (direction Y in FIG. 1) of the substrate. However, the direction in which the beams extend does not need to be limited. For example, they may be formed so that they extend in the lengthwise direction of the substrate. Further, the beams may be formed so that they form a grid. When forming the beams in a grid pattern, they may be formed at a narrow pitch in one direction or both directions so that they collectively function as a filter to prevent the foreign particles having mixed into ink from entering the common liquid chamber 9. When the beams are applied to microscopic structures other than ink jet recording heads, it is not mandatory that they are held to the mother member by both of their lengthwise ends; they may be held to the mother member by only one of the their lengthwise ends.

The beams may be in various forms different from those in the above described embodiments. For example, by shifting the position of the center of each of the first grooves from the center of the second mask in terms of the widthwise direction of the mask, it is possible to form asymmetrical beams. Further, by forming the first grooves, the walls of which are perpendicular to the substrate 1, at the edge of the second mask, it is possible to form beams, the cross section of which are in the form of a right-angled triangle. In order to form such beams, the projection formed in each of the first grooves becomes the wall of the corresponding beam, which is perpendicular to the bottom surface of the beam. Further, by controlling in shape the first grooves and second mask, it is possible to form such beams that are U-shaped in cross section.

Further, as described above, the vertical measurement in which each of the above described beams is formed can be easily changed by forming the first grooves so that they extend from the bottom to the peak of the beam. Therefore, the beam can be formed in various shapes. Similarly, the width in which the bottom of each beam is formed can be easily changed by changing the shape of the masking member.

The structure of each of the ink jet recording heads in the above described embodiments of the present invention is effective when applied to ink jet recording heads which employs the "liquid ejection method of bursting bubble type", or "bursting bubble liquid ejecting method".

The "bubble bursting liquid ejection method" means an ink jet recording method in which the bubbles generated by the film boiling triggered by the heating of ink are allowed to burst into the external air in the adjacencies of the ejection orifices, and has been proposed in Japanese Laid-open Patent Applications Hei 4-10940, 4-10941, 4-10942 and 4-12859 (Japanese Patent Application Nos. Hei 2-112832, 2-112833, 2-112834 and 2-114472, respectively), and the like.

The "bubble bursting liquid ejecting method" ensures that the bubbles rapidly grow toward an ejection orifice. Therefore, the "bubble bursting liquid ejecting method" makes it possible to highly reliably record at a high speed, while being assisted by the high rate of ink refilling performance achieved by the provision of the ink supplying hole with no blockage. Further, allowing the bubbles to burst into the external air eliminates the process in which the bubbles shrink. Therefore, the heaters and substrates are not damaged by cavitation. Further, one of the characteristic aspects of the "bubble bursting liquid ejection method" is that, in principle, all the ink on the ejection orifice side of the location, at which bubbles are formed, is ejected in the form of an ink droplet. Therefore, the amount by which ink is ejected per ejection is determined by such factors as the distance from the ejection orifice to the bubble generation point, recording head structure, and the like. Therefore, the abovementioned "bubble bursting liquid ejection method" is stable in the amount by which ink is ejected; it is less likely to be affected by the changes in ink temperature or the like.

In the case of an ink jet recording head of the side shooter type, the distance between an ink ejection orifice and the corresponding heat generating member can be easily controlled by controlling the thickness of an orifice plate, and this distance is one of the most important factors that determine the amount by which ink is ejected. Therefore, the ink jet recording heads in accordance with the present invention are well suited in structure for the "bubble bursting liquid ejection method".

To sum up, not only is the beam in accordance with the present invention well suited for ink jet recording apparatuses, but also, various microscopic structures employing beams. Further, not only is the beam forming method in accordance with the present invention useful for manufacturing an ink jet recording apparatuses, but also, various microscopic structures employing beams. In particular, they are useful when the anisotropic etching method is used during the manufacturing process for a microscopically structured product.

Lastly, referring to FIGS. 13 and 14, a typical ink jet recording apparatus and a typical ink jet head cartridge, which are compatible with an ink jet recording head in accordance with the present invention, will be described.

Figure 13:
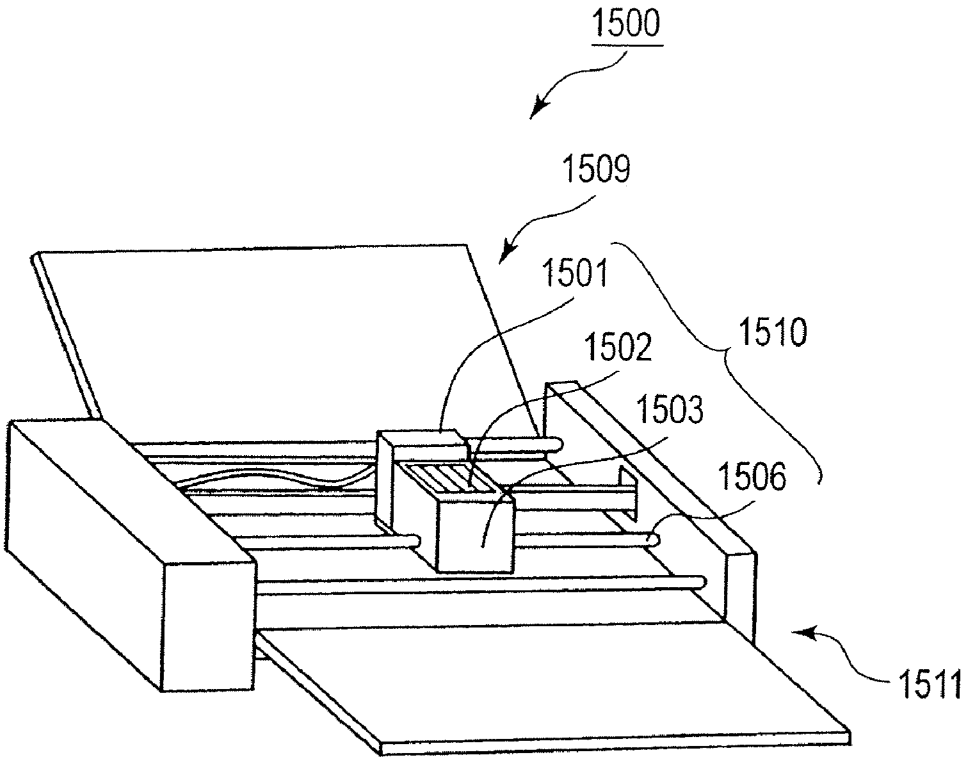
FIG. 13 is a perspective view of a typical recording apparatus compatible with an ink jet recording head in accordance with the present invention.

The ink jet recording apparatus shown in FIG. 13 comprises: a recording sheet feeding portion 1509 from which recording papers are fed into the main assembly of the ink jet recording apparatus; a recording portion 1510 which records on the recording sheet fed from the record sheet feeding portion 1509; a delivery tray portion 1511 into which the recording sheet is discharged after an image is recorded thereon. Recording is made by the recording portion 1510, on the recording sheet fed from the recording sheet feeding portion 1509, and then, the recording sheet is discharged into the delivery tray portion 1511 after the completion of the recording.

The recording portion 1510 is supported by a guiding shaft 1506 so that it is allowed to freely slide along the shaft 1506. It comprises: a carriage 1503 structured so that it can be freely shuttled in the direction parallel to the width direction of the recording sheet; a recording unit 1501 removably mountable on the carriage 1503; and a plurality of ink cartridges 1502.

Figure 14:
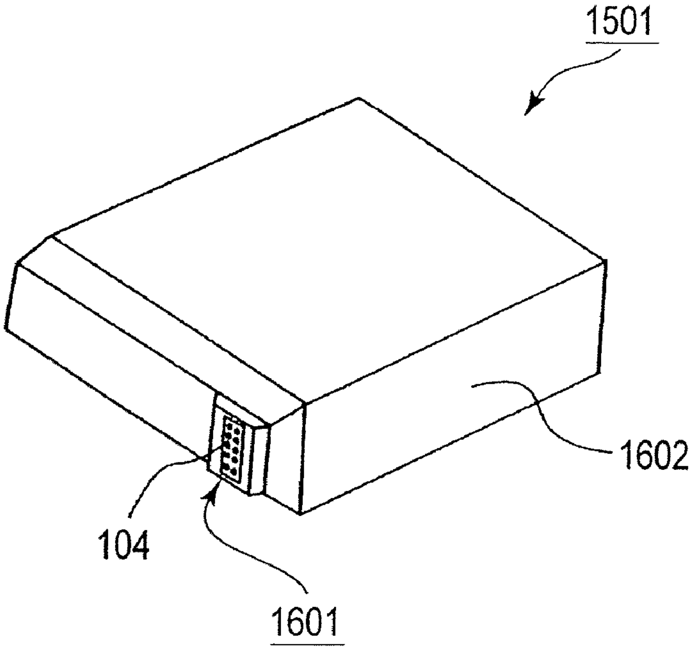
FIG. 14 is a perspective view of a typical head cartridge compatible with an ink jet recording head in accordance with the present invention.

The ink jet head cartridge 1501 shown in FIG. 14 is the combination of a holder 1602 and a recording head 1601 attached to the holder 1602. The recording head 1601 is provided with a plurality of ejection orifices 104. The holder 1602 is provided with ink passages (unshown) for supplying the ejection orifices 104 of the ink jet recording head 1601, with the ink from the ink cartridges 1502.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 416843/2003 filed Dec. 15, 2003, which is hereby incorporated by reference.

What is claimed is:

1. A beam having a base material of silicon monocrystal and at least one projection which is integrally formed so as to be supported at least at one end thereof and which has two surfaces having an orientation plane (111), comprising:

a bottom surface in a plane which is common with a plane of said base material;

a groove penetrating from said bottom surface to a top of said projection; and a protecting member having a resistance property against a crystal anisotropic etching liquid and covering an inner wall of said groove.

* * * * *